(12) United States Patent
Kim et al.

(10) Patent No.: US 10,825,378 B2
(45) Date of Patent: Nov. 3, 2020

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Sangwon Kim, Suwon-si (KR); Youngkook Kim, Suwon-si (KR); Jeongryeol Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/746,351

(22) Filed: Jan. 17, 2020

(65) Prior Publication Data

US 2020/0234628 A1    Jul. 23, 2020

(30) Foreign Application Priority Data

Jan. 18, 2019    (KR) .................. 10-2019-0006868

(51) Int. Cl.
*G06F 3/14* (2006.01)
*G09G 5/00* (2006.01)
(Continued)

(52) U.S. Cl.
CPC ......... *G09G 3/2092* (2013.01); *G06F 3/1446* (2013.01); *G06T 3/4092* (2013.01); *G09G 3/32* (2013.01); *G09G 2300/026* (2013.01)

(58) Field of Classification Search
CPC .... G06F 3/14; G06F 1/16; G06F 3/04; G09G 5/00; G09F 11/00
See application file for complete search history.

(56) References Cited

U.S. PATENT DOCUMENTS 9,805,688 B2    10/2017 Bae et al.
10,645,427 B2    5/2020 Lee
(Continued)

FOREIGN PATENT DOCUMENTS

KR    10-0408745 B1    12/2003
KR    10-2014-0017740 A    2/2014
(Continued)

OTHER PUBLICATIONS

Communication dated Mar. 31, 2020 issued by the European Intellectual Property Office in counterpart European Application No. 20152520.1.
(Continued)

*Primary Examiner* — Pegeman Karimi
(74) *Attorney, Agent, or Firm* — Sughrue Mion, PLLC

(57) ABSTRACT

Provided is an electronic apparatus and a controlling method thereof the electronic apparatus includes: an interface connectable to a modular display apparatus including a plurality of display cabinets divided into a plurality of groups, the interface including a plurality of ports connectable to the plurality of groups; and a processor configured to: scale an image received from an external device based on a resolution of the modular display apparatus, re-scale the scaled image based on a resolution based on a user input, identify at least one group, among the plurality of groups, based on a position in which the re-scaled image is to be displayed, decompose the re-scaled image based on the identified at least one group, and control to transmit the decomposed re-scaled image to each of the identified at least one group through at least one port connected to the identified at least one group.

20 Claims, 16 Drawing Sheets

(51) Int. Cl.
  *G09G 3/20* (2006.01)
  *G06T 3/40* (2006.01)
  *G09G 3/32* (2016.01)

(56) References Cited

U.S. PATENT DOCUMENTS

| | | | |
|---|---|---|---|
| 2012/0242893 A1* | 9/2012 | Akitomo | G06F 3/1446 348/441 |
| 2014/0119675 A1 | 5/2014 | Kim et al. | |
| 2015/0138040 A1* | 5/2015 | Teramae | G06F 3/1446 345/1.3 |
| 2015/0293740 A1* | 10/2015 | Cho | H04N 5/45 345/1.2 |
| 2016/0373653 A1 | 12/2016 | Park et al. | |
| 2016/0373789 A1 | 12/2016 | Tsukagoshi | |
| 2017/0038928 A1* | 2/2017 | Park | G06F 3/0488 |
| 2017/0206854 A1 | 7/2017 | Erhart | |
| 2017/0332116 A1 | 11/2017 | Lee | |
| 2018/0182288 A1 | 6/2018 | Kim et al. | |

FOREIGN PATENT DOCUMENTS

| | | |
|---|---|---|
| KR | 10-1528144 B1 | 6/2015 |
| KR | 10-2016-0030104 A | 3/2016 |
| KR | 10-2016-0062417 A | 6/2016 |
| KR | 10-2016-0149842 A | 12/2016 |
| KR | 10-1795522 B1 | 11/2017 |
| KR | 10-2018-0077412 A | 7/2018 |

OTHER PUBLICATIONS

International Search Report dated May 19, 2020 issued by the International Searching Authority in counterpart International Application No. PCT/KR2020/000892 (PCT/ISA/210).
Written Opinion dated May 19, 2020 issued by the International Searching Authority in counterpart International Application No. PCT/KR2020/000892 (PCT/ISA/237).

* cited by examiner

| | | | |
|---|---|---|---|
| 110-1 | 110-2 | 110-3 | 110-4 |
| 110-5 | 110-6 | 110-7 | 110-8 |
| 110-9 | 110-10 | 110-11 | 110-12 |
| 110-13 | 110-14 | 110-15 | 110-16 |

100

100

100

100

100

100

100

100

100

ELECTRONIC APPARATUS AND METHOD FOR CONTROLLING THEREOF

CROSS-REFERENCE TO RELATED APPLICATION(S)

This application is based on and claims priority under 35 U.S.C. § 119 to Korean Patent Application No. 10-2019-0006868, filed on Jan. 18, 2019, in the Korean Intellectual Property Office, the disclosure of which is incorporated by reference herein in its entirety.

BACKGROUND

1. Field

The disclosure relates to an electronic apparatus and a method for controlling the electronic apparatus and, more particularly, to an electronic apparatus that scales an image to a resolution of a panel and then re-scales the scaled image to various resolutions and displays the same, and a controlling method thereof.

2. Description of Related Art

Recently, with the development of electronic technology, various electronic apparatuses have been developed. In particular, a modular display apparatus in which a plurality of display modules is connected has been developed.

This modular display apparatus may provide a user with visual satisfaction by displaying a high-resolution image through a large-scaled screen.

In some cases, a user desires to view an image through some areas among areas all display areas of the modular display apparatus. In this case, there is a necessity to scale a resolution of an image to correspond to some areas.

SUMMARY

Provided are an electronic apparatus that scales an image to a resolution of a panel and then re-scales the scaled image to various resolutions and displays the same, and a controlling method thereof.

Additional aspects will be set forth in part in the description which follows and, in part, will be apparent from the description, or may be learned by practice of the presented embodiments.

In accordance with an aspect of the disclosure, an electronic apparatus includes: an interface connectable to a modular display apparatus including a plurality of display cabinets divided into a plurality of groups, the interface including a plurality of ports connectable to the plurality of groups; and a processor configured to: scale an image received from an external device based on a resolution of the modular display apparatus, re-scale the scaled image based on a resolution selected in accordance with a user input, identify at least one group, among the plurality of groups, based on a position in which the re-scaled image is to be displayed, decompose the re-scaled image into a plurality of images based on the identified at least one group, and control to transmit the decomposed re-scaled image to each of the identified at least one group through at least one port, among the plurality of ports, connected to the identified at least one group.

A size of the re-scaled image may be identified based on the resolution selected in accordance with the user input.

The processor may be configured to: control to transmit the scaled image to the modular display apparatus; and based on receiving the user input while the transmitted scaled image is displayed on the modular display apparatus, re-scale the scaled image based on the resolution selected in accordance with the user input.

The resolution of the modular display apparatus may be identified based on a number of pixels included in the plurality of display cabinets; and the resolution selected in accordance with the user input may be lower than the resolution of the modular display apparatus.

The processor may be configured to: identify a position in which the decomposed re-scaled image is to be displayed by the plurality of groups based on the resolution of the modular display apparatus and the resolution of the re-scaled image; and control to transmit, to the identified at least one group, information on the identified position in which the decomposed re-scaled image is to be displayed.

Each of the plurality of display cabinets may include a plurality of display modules; and at least one display module, among a plurality of display modules included in the identified at least one group, may be configured to display the decomposed re-scaled image based on the information on the position, and remaining display modules other than the at least one display module, among the plurality of display modules included in the identified at least one group, may not be driven.

The processor may be configured to: based on a presence of an area, among areas corresponding to the identified at least one group, in which the re-scaled image is not displayed being identified based on the information on the position, control to transmit a background image to be displayed on the area in which the re-scaled image is not displayed to the identified at least one group.

The processor may be configured to: control to transmit a background image to be displayed on at least one display module included in remaining groups, other than the identified at least one group, to the remaining groups through at least one port connected to the remaining groups.

At least one display module included in a remaining group, other than the identified at least one group, may not be driven.

Each of the plurality of display cabinets may include a plurality of display modules; and each of the plurality of display modules may include a plurality of micro light emitting diode (LED).

In accordance with another aspect of the disclosure, a controlling method of an electronic apparatus includes: scaling an image received from an external device based on a resolution of a modular display apparatus including a plurality of display cabinets divided into a plurality of groups; re-scaling the scaled image based on a resolution selected in accordance with a user input; identifying at least one group, among the plurality of groups, based on a position in which the re-scaled image is to be displayed; decomposing the re-scaled image into a plurality of images based on the identified at least one group; and transmitting the decomposed re-scaled image to each of the identified at least one group through at least one port, among a plurality of ports respectively connected to the plurality of groups, connected to the identified at least one group.

A size of the re-scaled image may be identified based on the resolution selected in accordance with the user input.

The re-scaling may include: transmitting the scaled image to the modular display apparatus; and based on receiving the user input while the transmitted scaled image is displayed on the modular display apparatus, re-scaling the scaled image based on the resolution selected in accordance with the user input.

The resolution of the modular display apparatus may be identified based on a number of pixels included in the plurality of display cabinets; and the resolution selected in accordance with the user input may be lower than the resolution of the modular display apparatus.

The method may further include: identifying a position in which the decomposed re-scaled image is to be displayed by the plurality of groups based on the resolution of the modular display apparatus and the resolution of the re-scaled image; and transmitting, to the identified at least one group, information on the identified position in which the decomposed re-scaled image is to be displayed.

Each of the plurality of display candidates may include a plurality of display modules; and at least one display module, among a plurality of display modules included in the identified at least one group, may be configured to display the decomposed re-scaled image based on the information on the position, and remaining display modules other than the at least one display module, among the plurality of display modules included in the identified at least one group, may not be driven.

The method may further include: based on a presence of an area, among areas corresponding to the identified at least one group, in which the re-scaled image is not displayed being identified based on the information on the position, transmitting a background image to be displayed on the area in which the re-scaled image is not displayed to the identified at least one group.

The method may further include: transmitting a background image to be displayed on at least one display module included in remaining groups, other than the identified at least one group, to the remaining groups through at least one port connected to the remaining groups.

At least one display module included in a remaining group, other than the identified at least one group, may not be driven.

Each of the plurality of display cabinets may include a plurality of display modules; and each of the plurality of display modules may include a plurality of micro light emitting diode (LED).

In accordance with another aspect of the disclosure, a controlling method of an electronic apparatus includes: scaling an image based on a resolution for displaying the image on a modular display apparatus including a plurality of display cabinets divided into a plurality of groups, the resolution for displaying the image being less than a resolution of the modular display apparatus; identifying at least one group, among the plurality of groups, based on a position in which the scaled image is to be displayed; obtaining, from the scaled image, a plurality of images based on the identified at least one group; and transmitting the plurality of images to the identified at least one group.

A size of the scaled image may be identified based on the resolution for displaying the image, selected in accordance with a user input.

The scaling may include: transmitting the image to the modular display apparatus; and based on receiving a user input while the transmitted image is displayed on the modular display apparatus, scaling the image based on the resolution for displaying the image, selected in accordance with the user input.

The method may further include: identifying a position in which the scaled image is to be displayed by the plurality of groups based on the resolution of the modular display apparatus and the resolution of the scaled image; and transmitting, to the identified at least one group, information on the identified position in which the scaled image is to be displayed.

Each of the plurality of display candidates may include a plurality of display modules; and at least one display module, among a plurality of display modules included in the identified at least one group, may be configured to display the scaled image based on the information on the position, and remaining display modules other than the at least one display module, among the plurality of display modules included in the identified at least one group, may not be driven.

In accordance with another aspect of the disclosure, a non-transitory computer-readable recording medium has recorded thereon at least one instruction executable by a processor to perform a controlling method of an electronic apparatus, the method including: scaling an image received from an external device based on a resolution of a modular display apparatus including a plurality of display cabinets divided into a plurality of groups; re-scaling the scaled image based on a resolution selected in accordance with a user input; identifying at least one group, among the plurality of groups, based on a position in which the re-scaled image is to be displayed; decomposing the re-scaled image into a plurality of images based on the identified at least one group; and transmitting the decomposed re-scaled image to each of the identified at least one group through at least one port, among a plurality of ports respectively connected to the plurality of groups, connected to the identified at least one group.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1C is a view illustrating a cabinet, according to an embodiment;

DETAILED DESCRIPTION

Hereinafter, embodiments of the disclosure will be described in detail with reference to the accompanying drawings. It is understood, however, that the disclosure is not limited to embodiments described herein.

Hereinafter, it is understood that expressions such as "at least one of," when preceding a list of elements, modify the entire list of elements and do not modify the individual elements of the list. For example, the expressions "at least one of [A], [B], and [C]" or "at least one of [A], [B], or [C]" means only A, only B, only C, A and B, B and C, A and C, or A, B, and C.

Figure 1A:
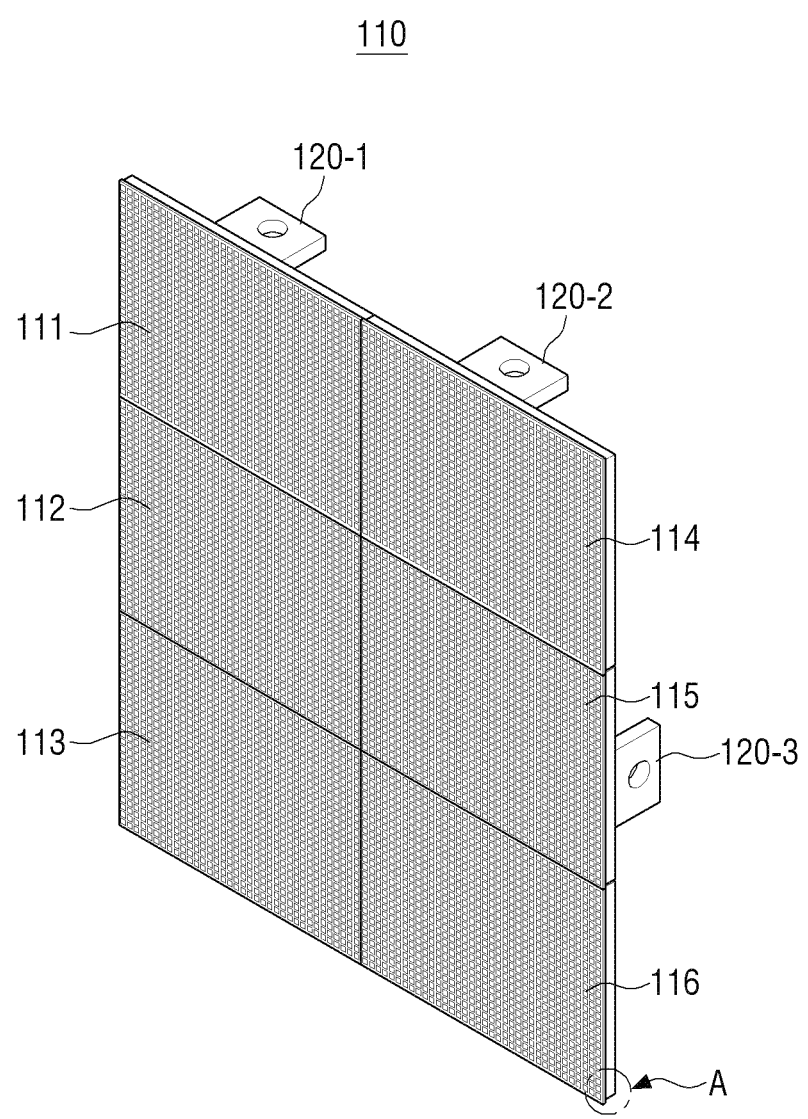
FIG. 1A is a view illustrating a cabinet, according to an embodiment.
Figure 1B:
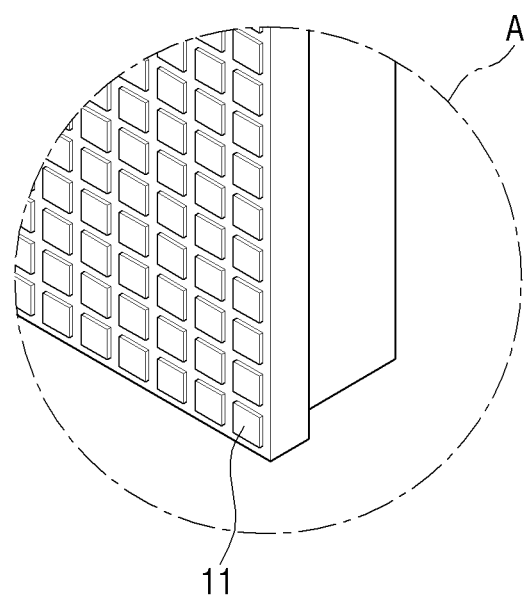
FIG. 1B is a view illustrating a cabinet, according to an embodiment.

FIGS. 1A to 1C are views illustrating a cabinet 110 according to an embodiment.

A cabinet 110 according to an embodiment may include at least one display module.

For example, referring to FIG. 1A, a cabinet 110 according to an embodiment may include six display modules 111 to 116. Each display module 111 to 116 may be physically connected.

Each of the plurality of display modules 111 to 116 may be implemented as a light emitting diode (LED) display module including an inorganic LED.

Specifically, referring to FIG. 1B, each of the display modules 111 to 116 may be implemented as an LED display module that includes a plurality of LEDs 11 that implement a red LED, a green LED, and a blue LED, which are sub-pixels, as one pixel.

Here, a plurality of pixels may be arranged in a matrix form (for example, M×N, where M and N are natural numbers). Specifically, the matrix may be in the same arrangement (e.g., M=N, where M and N are natural numbers, 16×16 format, 24×24 format, etc.), or may be another arrangement (e.g., M≠N, where M and N are natural numbers).

According to an embodiment, the LEDs of the LED display module may be implemented as a micro LED. Here, the micro LED may be an LED having a size about 5 to 100 micrometers, and may be a superminiature light emitting element that emits light by itself without a color filter.

Further, the modular display apparatus 100 according to an embodiment may be implemented to be bezel-less and may display a seamless image in which there is no disconnection between modules 111 to 116 and/or between cabinets in displaying an image.

However, the LED display module is merely an example, and the display module may be implemented in other forms. For example, according to various other embodiments, the display module may be implemented as a liquid crystal display (LCD) panel that is a planer display panel, an organic LED (OLED) panel, an active matrix OLED (AMO-LED) panel, a plasma display panel (PDP), or the like.

Hereinafter, for convenience of description, the display module according to an embodiment is exemplified as the LED display module.

Referring back to FIG. 1A, the cabinet 110 according to an embodiment may be implemented in a form in which the plurality of display modules 111 to 116 are combined in a 2×3 format.

It is understood that the LED display module in a 2×3 format is merely an example, and the arrangement format and the number of the LED display modules may vary in a diverse manner.

The cabinet 110 may include a base plate capable of mounting the display modules 111 to 116, respectively. For example, the base plate may be implemented in a manner that each display module may be mounted on the front surface of the base plate.

The cabinet 110 according to an embodiment may include a plurality of couplers 120-1 to 120-3 for coupling the cabinet 100 with one or more other cabinets. The positions and number of couplers 120-1 to 120-3 of FIG. 1A is merely exemplary, and the positions and number of the couplers may vary in a diverse manner.

Accordingly, the cabinet 110 according to an embodiment may be implemented as a modular display apparatus 100 through coupling with one or more cabinets.

For example, referring to FIG. 1C, a plurality of cabinets 110-1 to 110-16 according to an embodiment may be coupled in a 4×4 format, to implement the modular display apparatus 100 such as a video wall. It is understood, however, that the modular display apparatus in a 4×4 format is only an example, and the arrangement and the number of the cabinet may vary in a diverse manner.

The modular display apparatus 100 may display an image through a display module included in each of the plurality of cabinets 110-1 to 110-16. Here, the image may be an image received from an external device, a prestored image, etc.

Figure 1D:
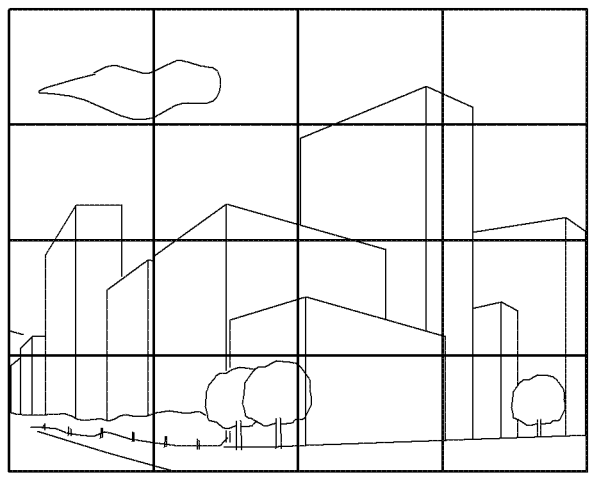
FIG. 1D is a view illustrating an image displayed by a modular display apparatus according to an embodiment.

As illustrated in FIG. 1D, the modular display apparatus 100 according to an embodiment may display an image through a plurality of cabinets 110-1 to 110-16. A specific description regarding an image display method of the modular display apparatus 100 is provided below.

Figure 2:
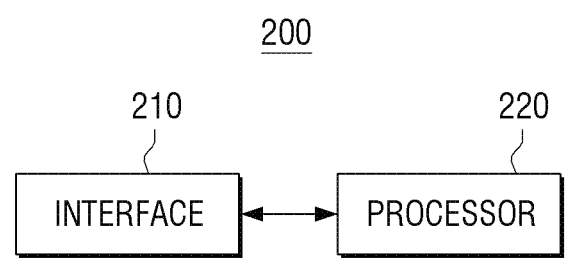
FIG. 2 is a block diagram illustrating an electronic apparatus, according to an embodiment.

FIG. 2 is a block diagram illustrating an electronic apparatus 200 according to an embodiment.

Referring to FIG. 2, an electronic apparatus 200 according to an embodiment includes an interface 210 and a processor 220.

The interface 210 may be connected to the modular display apparatus 100. As described above, the modular display apparatus 100 may be a display apparatus that physically connects the plurality of cabinets.

The interface 210 may be connected to the modular display apparatus 100 through a port. To be specific, the interface 210 may be connected to the modular display apparatus 100 through a cable connected to the port. Here, the cable may be a high definition multimedia interface (HDMI) cable. The HDMI cable is merely an example, and it is understood that the cable may vary. For example, the cable may be a digital visual interface (DVI) cable, a low voltage differential signals (LVDS) cable, an optical cable, etc.

In addition, the interface 210 may be connected to the modular display apparatus 100 through wireless communication. In this case, the interface 210 may include a Wi-Fi chip, a Bluetooth chip, a wireless communication chip, or the like.

The interface 210 may be connected to the modular display apparatus 100 through each of a plurality of ports.

For example, as illustrated in FIG. 1C, in the case of the modular display apparatus 100 in which the plurality of cabinets 110-1 to 110-16 are coupled in a 4×4 format, the interface 210 may be connected to the plurality of cabinets 110-1 to 110-16 through each of a plurality of ports. For this purpose, the interface 210 may include at least 16 ports that may be connected to each of the plurality of cabinets 110-1 to 110-16.

According to another embodiment, the interface 210 may be connected to some cabinets among the plurality of cabinets through each of the plurality of ports.

For example, the interface 210 may be connected to some cabinets 110-5 to 110-8 and 110-13 to 110-16 among the plurality of cabinets 110-1 to 110-16 through each of a plurality of ports. For this purpose, the interface 210 may include at least eight or more ports that can be connected to each of some cabinets 110-5 to 110-8 and 110-13 to 110-16.

Figure 3:
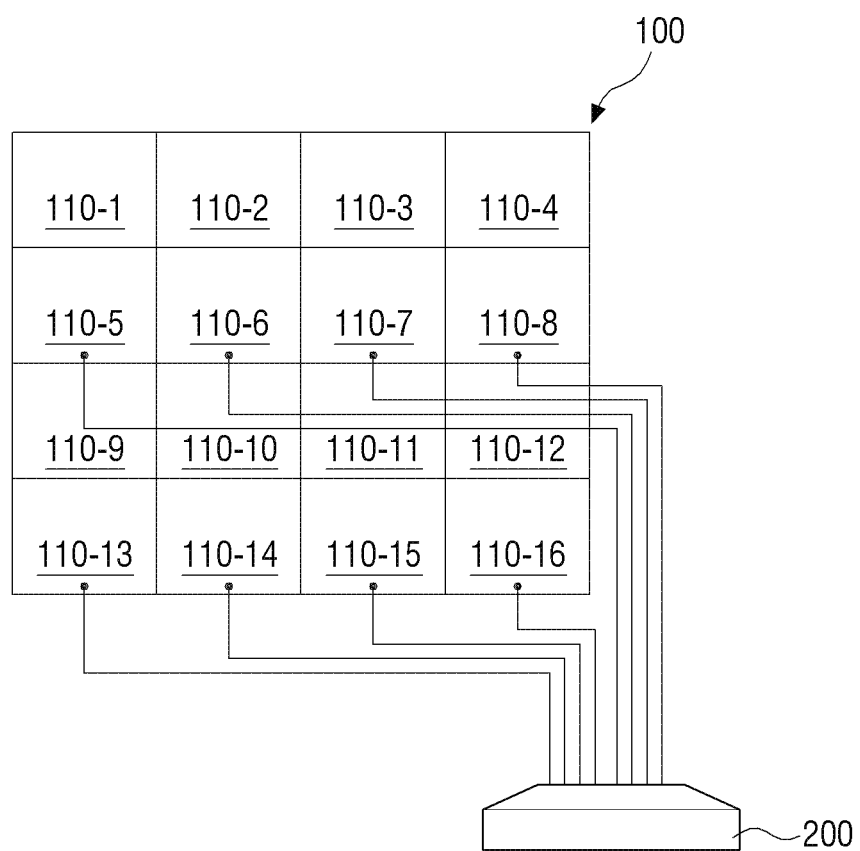
FIG. 3 is a view illustrating a connection structure between an electronic apparatus and a modular display apparatus, according to an embodiment.

Specifically, referring to FIG. 3, a connector that may be connected to each of a plurality of ports of the electronic apparatus 200 may be included on a rear surface of each cabinet 110-1 to 110-16 forming the modular display apparatus 100. Further, the electronic apparatus 200 may be connected to some (but not all) cabinets 110-5 to 110-8 and 110-13 to 110-16 that form the modular display apparatus 100 through each of the plurality of ports.

As such, through connection with some cabinets 110-5 to 110-8 and 110-13 to 110-16, the module display apparatus 100 and/or the electronic apparatus 200 may reduce probability of error occurrence in data transmission by cable damage and save cost of a product.

Hereinbelow, for convenience of description, it has been described that the modular display apparatus 100 and the electronic apparatus 200 according to an embodiment are connected as illustrated in FIG. 3, but this connection structure is merely exemplary, and the connection structure may vary according to various embodiments.

The processor 220 controls overall operations of the electronic apparatus 200. For this purpose, the processor 220 may include one or more of a central processing unit (CPU), an application processor (AP), a communication processor (CP), etc.

The processor 220 may scale a resolution of an image. The image may be an image received from an external device such as a server, a set-top box, a universal serial bus (USB) storage, a personal computer (PC), a smartphone, etc., or an image stored in a storage.

Specifically, the processor 220 may scale a resolution of an image bead on the resolution of the modular display apparatus 100.

For example, if (or based on) the resolution of the modular display apparatus 100 is 3,840×2,160, and the number of pixels of the modular display apparatus 100 is 8,294,400, the processor 220 may scale the resolution of the image to 4K resolution. Alternatively, when (or based on) the horizontal and vertical resolution of the modular display apparatus 100 is 7680×4320, and the number of pixels of the modular display apparatus 100 is 33,177,600, the processor 220 may scale the resolution of the image to 8K resolution.

As an embodiment, when the electronic apparatus 200 is connected to the modular display apparatus 100 that provides an 8K resolution, the processor 220, when (or based on) an image of 4K resolution is received from an external device, may upscale the resolution of the received image to 8K.

For this purpose, the electronic apparatus 200 may pre-store information on the resolution of the modular display apparatus 100. Alternatively, the electronic apparatus 200 may receive information on the resolution of the display apparatus 100 from the modular display apparatus 100 or via a user input.

The processor 220 may transmit the scaled image to the modular display apparatus 100 through the interface 210.

By way of example, the processor 220 may divide a plurality of cabinets forming the modular display apparatus 100 into a plurality of groups in a vertical or a horizontal direction, and transmit a scaled image to the plurality of groups through a port connected to each of the plurality of groups.

The plurality of groups may be divided based on a port (or ports) connected to the modular display apparatus 100.

For example, as illustrated in FIG. 3, when the modular display apparatus 100 has a structure in that 16 cabinets are arranged and coupled in a 4×4 format, and the fifth to eighth cabinets 110-5 to 110-8 of the modular display apparatus 100 are connected to each of the first to fourth ports of the electronic apparatus 200, the processor 220 may divide (or group) a first cabinet 110-1 connected to the fifth cabinet 110-5 in a daisy-chain method and the fifth cabinet 110-5 into a first group, divide the second cabinet 110-2 connected to the sixth cabinet 110-6 by a daisy-chain method and the sixth cabinet 110-6 into a second group, divide a third cabinet 110-3 connected to the seventh cabinet 110-7 by a daisy-chain method and the seventh cabinet 110-7 into a third group, and divide a fourth cabinet 110-4 connected to the eighth cabinet 110-8 by a daisy-chain method and the eighth cabinet 110-8 into a fourth group.

When the thirteenth to sixteenth cabinets 110-13 to 110-16 of the modular display apparatus 100 are connected to the fifth to eighth ports of the electronic apparatus 200, respectively, the processor 220 may divide (or group) the ninth cabinet 110-9 connected by a daisy-chain method and the thirteenth cabinet 110-13 into a fifth group, divide a tenth cabinet 110-10 connected to the fourteenth cabinet 110-14 by a daisy-chain method and the fourteenth cabinet 110-14 into a sixth group, divide an eleventh cabinet 110-11 connected to a fifteenth cabinet 110-15 by a daisy-chain method and the fifteenth cabinet 110-15 into a seventh group, and divide a twelfth cabinet 110-12 connected to a sixteenth cabinet 110-16 by a daisy-chain method and sixteenth cabinet 110-16 into an eighth group.

The processor 220 may decompose a scaled image. The decomposed image may be an image that is obtained by decomposing a scaled image based on the number of a plurality of cabinets and each position of the cabinet.

For example, as described above, when a plurality of cabinets 110-1 to 110-16 are arranged in a format of 4×4, the processor 220 may divide the scaled image into 16 equal parts by dividing a scaled image into four equal parts from a left side to a right side and divide the scaled image into four equal parts from an upper side to a lower side.

The processor 220 may identify an image (or image portions) corresponding to the first and fifth cabinets 110-1 and 110-5, among the image that is divided into 16 equal portions, into an image corresponding to a first group, identify an image corresponding to the second to the sixth cabinets 110-2 and 110-6 into an image corresponding to a second group, identify an image corresponding to the third and seventh cabinets 110-3 and 110-7 into an image corresponding to a third group, identify an image corresponding to the fourth and eighth cabinets 110-4 and 110-8 into an image corresponding to a fourth group, identify an image corresponding to the ninth and thirteenth cabinets 110-9 and 110-13 as an image corresponding to the fifth group, identify an image corresponding to the tenth and fourteenth cabinet 110-10 and 110-14 into an image corresponding to a sixth group, identify an image corresponding to eleventh and fifteenth cabinets 110-11 and 110-15 into an image corresponding to a seventh group, and identify an image corresponding to twelfth and sixteenth cabinets 110-12 and 110-16 into an image corresponding to an eighth group.

The processor 220 may transmit an image (or image portions) corresponding to each group to each of the plurality of groups through each of the plurality of ports. Specifically, the processor 220 may transmit an image corresponding to each group to each of the first through eighth groups through each of the first through eighth ports, respectively.

Accordingly, the modular display apparatus 100 may display a scaled image.

Specifically, when (or based on) the image corresponding to the first group is transmitted in the fifth cabinet 110-5 from the first port of the electronic apparatus 200, the modular display apparatus 100 may transmit or provide the received image to the first cabinet 110-1 connected by a daisy-chain method, and when (or based on) the image corresponding to the second group is transmitted to the sixth cabinet 110-6 from the second port, the received image may be transmitted or provided to the second cabinet 110-2 connected by the daisy-chain method. Similarly, each cabinet connected to a port of the electronic apparatus 200 may perform the same operation as the above-described method.

The modular display apparatus 100 may reproduce an image corresponding to a position of each cabinet in a received image by cropping through a timing controller (T-CON) included in each cabinet.

To be specific, the first cabinet 110-1 may crop and reproduce an image corresponding to the first cabinet among an image corresponding to the first group, the fifth cabinet 110-5 may crop and reproduce an image corresponding to the fifth cabinet from an image corresponding to the first group, the second cabinet 110-2 may crop and reproduce an image corresponding to a second cabinet from an image corresponding to the second group, the sixth cabinet 110-6 may crop and reproduce an image corresponding to the sixth cabinet from an image corresponding to the second group, etc. Similarly, another cabinet connected to a port of the electronic apparatus 200 may perform the same operation as the above method.

The modular display apparatus 100 may display a scaled image.

The processor 220 may re-scale a scaled image based on a resolution selected, for example, according to a user input. The size of the re-scaled image may be identified based on the resolution selected according to the user input as described above. For example, when the resolution of the scaled image is 8K and the resolution selected according to a user input is 4K, the re-scaled image may be an image having a width by height of 3840×2160 (pixel).

The resolution of the re-scaled image may be selected according to a user input for selecting a specific resolution or may be selected according to a user input for selecting an area on which the re-scaled image is to be displayed. To be specific, when a user input to select at least two display modules, among a plurality of display modules included in the modular display apparatus 100, is input, the processor 220 may identify a display area on which the re-scaled image is to be displayed based on the coordinate information of the selected display module.

For example, when a display module corresponding to coordinate (1, 1) and a display module corresponding to coordinate (2, 2) is selected among a plurality of display modules included in the modular display apparatus 100, the processor 220 may identify the display module corresponding to coordinate (1, 1), a display module corresponding to coordinate (1, 2), a display module corresponding to coordinate (2, 1), and a display module corresponding to coordinate (2, 2) as a display area. The processor 220 may identify a resolution of a display area based on a number of pixels included in a corresponding display area and re-scale the scaled image based on the resolution of the display area.

While the scaled image is being displayed in the modular display apparatus 100, if (or based on) the user input to change the resolution is received, the processor 220 may re-scale the scaled image based on the resolution selected according to the user input. The processor 220, when (or based on) it is pre-identified that an image is displayed with a resolution different from the resolution of the modular display apparatus 100, may re-scale the scaled image with the pre-identified resolution.

The processor 220 may transmit the re-scaled image to the modular display apparatus 100 through the interface 210.

The processor 220 may identify at least one group, among a plurality of groups constituting the modular display apparatus 100, based on a position on which the re-scaled image is to be displayed, and transmit the re-scaled image to the identified group through at least one port that is connected to the identified group, among a plurality of ports.

The position where the re-scaled image is to be displayed may be defaulted to a central area of the modular display apparatus 100 or may be set or changed in accordance with a user input in various manners. For example, the position in which the re-scaled image is to be displayed may be one of an upper area, a lower area, an upper left area, a lower left area, an upper right area, or a lower right area.

In identifying at least one group among a plurality of groups, the processor 220 may identify at least one group described above, in consideration of the resolution of the modular display apparatus 100 and the resolution of the re-scaled image.

For example, when the modular display apparatus 100 has a structure in which 16 cabinets having a resolution of 1920×1080 are arranged and combined in a 4×4 format, if the horizontal and vertical resolution of the modular display apparatus 100 is 7680×4320, the resolution of the re-scaled image is 5760×3240, and the position in which the re-scaled image is to be displayed is set to an upper left area, the processor 220 may identify a first group including the first and fifth cabinets 110-1 and 110-5, a second group including the second and sixth cabinets 110-2 and 110-6, a third group including the third and sixth cabinets 110-3 and 110-6, a fifth group including the ninth cabinet 110-9, a sixth group including the tenth cabinet 110-10, and a seventh group including the eleventh cabinet 110-11, among the first to sixteenth cabinets 110-1 to 110-16, as groups to which the re-scaled image is to be transmitted.

The processor 220 may transmit the re-scaled image to each identified group through at least one port connected to the identified group, among a plurality of ports. The re-scaled image transmitted to each group may be an image corresponding to each group.

The processor 220 may decompose the re-scaled image. Here, the decomposed image refers to an image that is obtained by decomposing the re-scaled image based on the number of a plurality of cabinets included in the identified group and the position of each cabinet.

Figure 4A:
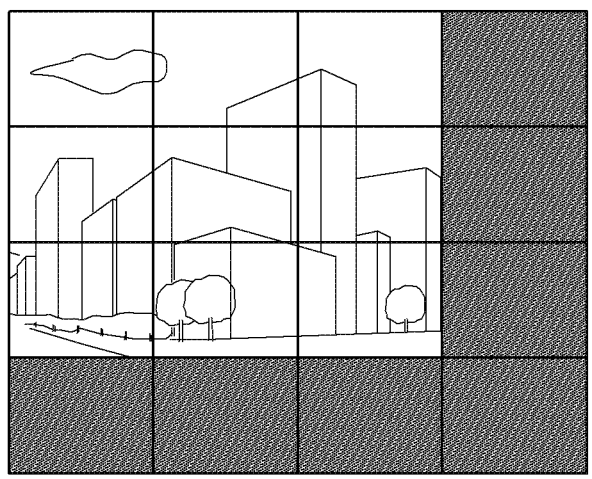
FIG. 4A is a view illustrating a display of a re-scaled image in a modular display apparatus according to an embodiment.

For example, as illustrated in FIG. 4A, when the plurality of cabinets included in the identified group is arranged in a 3×3 format, the processor 220 may divide the scaled image into nine equal parts by dividing the re-scaled image into three parts from the left side to the right side and into three parts from the upper side to the lower side (i.e., three rows and three columns).

The processor 220 may identify the image corresponding to the first and fifth cabinets 110-1 and 110-5 as an image corresponding to the first group, identify the image corresponding to the second and sixth cabinets 110-2 and 110-6 as an image corresponding to the second group, identify an image corresponding to the third and seventh cabinets 110-3 and 110-7 as an image corresponding to the third group, identify an image corresponding to the ninth cabinet 110-9 as an image corresponding to the fifth group, identify an image corresponding to the tenth cabinet 110-10 as an image corresponding to the sixth group, and identify an image corresponding to the eleventh cabinet 110-11 as an image corresponding to the seventh group, from the image that is divided into nine equal parts.

The processor 220 may transmit (e.g., control to transmit) an image corresponding to each group to each of the plurality of groups through each of the plurality of ports. To be specific, the processor 220 may transmit an image corresponding to the first group to the first group through the first port, transmit an image corresponding to the second group to the second group through the second port, transmit an image corresponding to the third group to the third group through the third port, transmit an image corresponding to the fifth group to the fifth group through the fifth port, transmit an image corresponding to the sixth group to the sixth group, and transmit an image corresponding to the seventh group to the seventh group.

The processor 220 may transmit (e.g., control to transmit) information on a position on which an image corresponding to each group is to be displayed to each of the plurality of groups.

For example, when transmitting an image corresponding to the first group to the first group through the first port, the processor 220 may transmit information on a position in which an image corresponding to a first group is to be displayed in the first group to the first group, so that an image corresponding to the first cabinet 110-1 is displayed on the first cabinet 110-1 from the image (or images) corresponding to the first group, and an image corresponding to the fifth cabinet 110-5 is displayed on the fifth cabinet 110-5 from the image (or images) corresponding to the first group. For example, the processor 220 may transmit, to the first group, an image corresponding to the first group in which a first identifier is included in or for the image corresponding to the first cabinet 110-1 and a fifth identifier is included in or for an image corresponding to the fifth cabinet 110-5. Similarly, when transmitting an image to the second to the fourth groups, the processor 220 may transmit information on a position on which an image corresponding to each group is to be displayed to each of the plurality of groups.

When transmitting an image corresponding to the fifth group to the fifth group through the fifth port, the processor 220 may transmit information on a position in which an image corresponding to the fifth group is to be displayed on the fifth group to the fifth group, so that an image corresponding to the fifth group is displayed on the ninth cabinet 110-9.

The modular display apparatus 100 may display an image corresponding to the fifth group through the ninth cabinet 110-9 among the ninth and thirteenth cabinets 110-9 and 110-13 included in the fifth group, and may not drive a plurality of display modules included in the thirteenth cabinet 110-13.

Similarly, in each of the sixth group and the seventh group, the modular display apparatus 100 may display an image in the tenth and eleventh cabinets 110-10 and 110-11 and may not drive a plurality of display modules included in the fourteenth and fifteenth cabinets 110-14 and 110-15.

The fourth and eighth groups of the modular display apparatus 100 do not receive an image from the electronic apparatus 200 and the modular display apparatus 100 may not drive a plurality of display modules included in the fourth group and the eighth group.

In the present embodiment, a display module is not driven in an area where an image is not displayed, and thus, there is an effect of reducing power consumption.

As described above, a position in which a re-scaled image is to be displayed may be one of an upper area, a lower area, an upper left area, an upper right area, and a lower right area of the modular display apparatus 100.

Figure 4B:
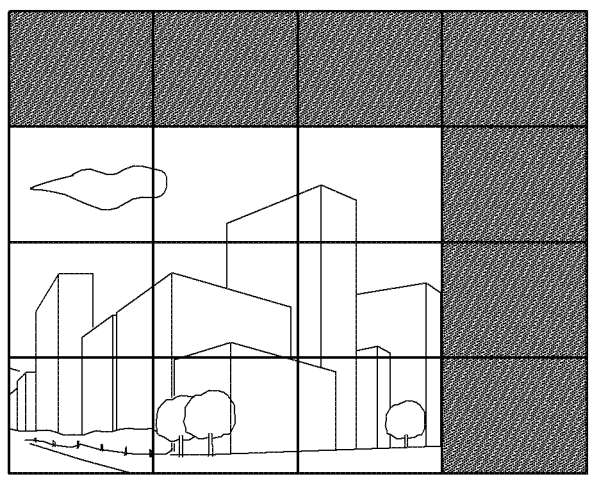
FIG. 4B is a view illustrating a display of a re-scaled image in a modular display apparatus according to an embodiment.
Figure 4C:
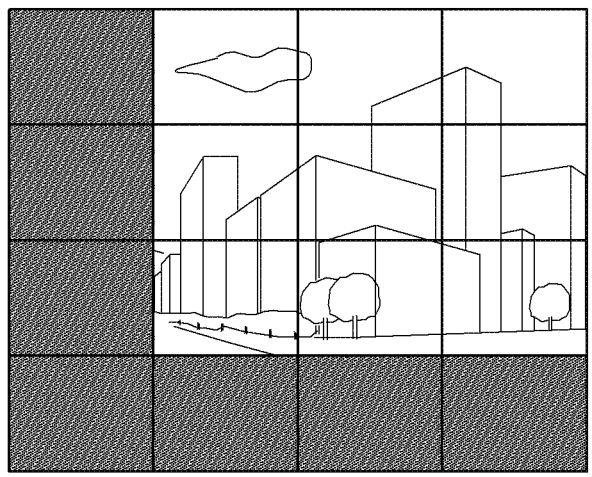
FIG. 4C is a view illustrating a display of a re-scaled image in a modular display apparatus according to an embodiment.
Figure 4D:
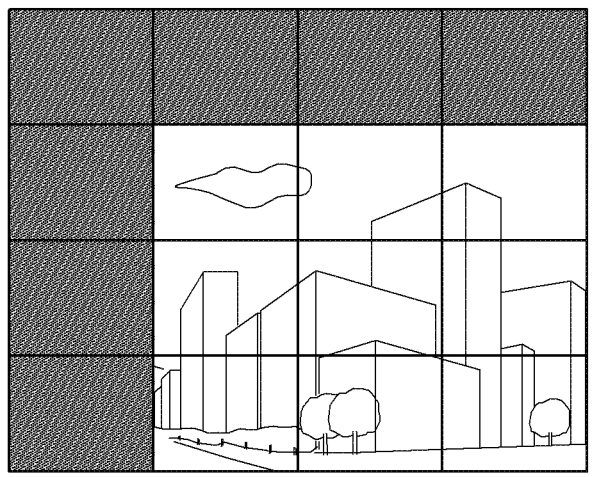
FIG. 4D is a view illustrating a display of a re-scaled image in a modular display apparatus according to an embodiment.
Figure 4E:
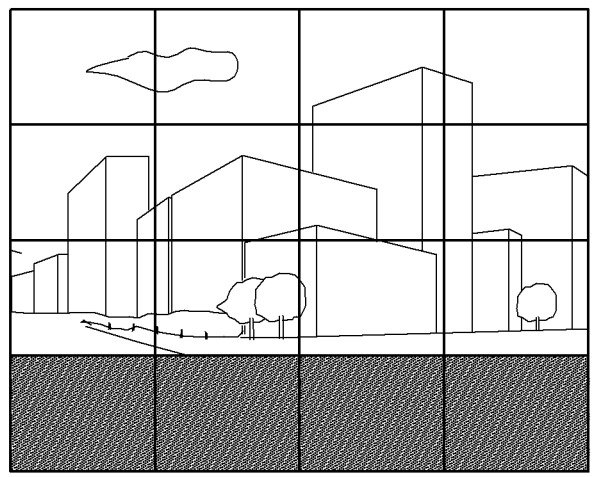
FIG. 4E is a view illustrating a display of a re-scaled image in a modular display apparatus according to an embodiment.
Figure 4F:
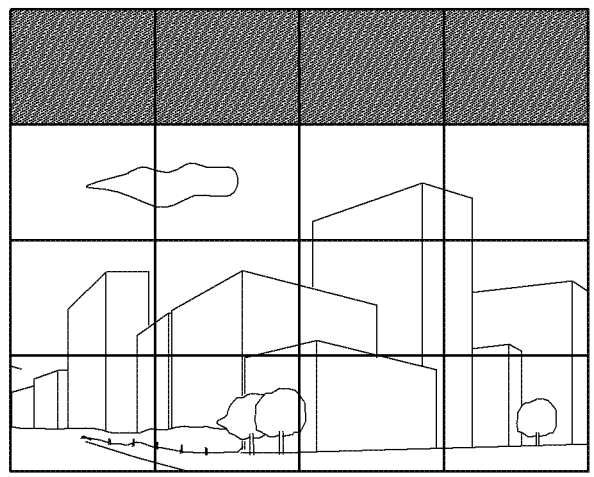
FIG. 4F is a view illustrating a display of a re-scaled image in a modular display apparatus according to an embodiment.

Accordingly, the modular display apparatus 100 may display the re-scaled image in the lower left area, as shown in FIG. 4B, or the re-scaled image in the upper right area, as shown in FIG. 4C. As shown in FIG. 4D, a re-scaled image may be displayed in the lower right area, and as shown in FIG. 4E, the re-scaled image may be displayed in an upper area. As shown in FIG. 4F, a re-scaled image may be displayed in a lower area.

As described above, displaying a re-scaled image in various areas is possible, and thus, the modular display apparatus 100 and/or the electronic apparatus 200 may provide an image that meets user's needs. As illustrated in FIGS. 4B to 4F, a method of displaying an image may be applied in a same or similar manner as described above with reference to FIG. 4A.

Figure 5:
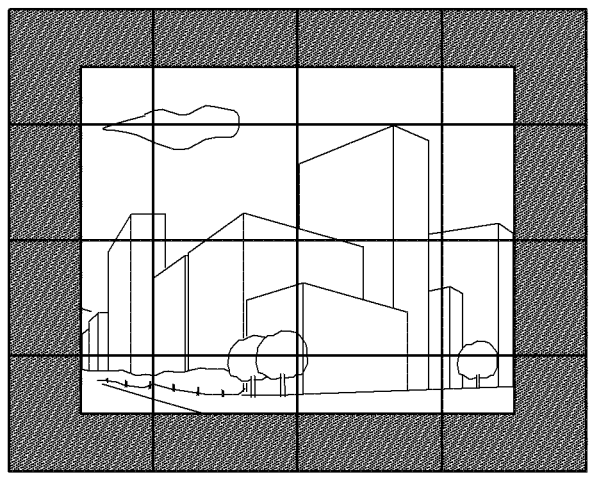
FIG. 5 is a view illustrating a display of a re-scaled image in a modular display apparatus according to an embodiment.

Meanwhile, as shown in FIG. 5, the modular display apparatus 100 has a structure in which 16 cabinets having a resolution of 1920×1080 are arranged in a 4×4 format. In this case, if the horizontal and vertical resolution of the modular display apparatus 100 is 7680×4320, the resolution of the re-scaled image is 5760×3240, and the position at which the re-scaled image is to be displayed is set to the center area, the processor 220 may identify the first group including the first and fifth cabinets 110-1 and 110-5, the second group including the second and the sixth cabinets 110-2 and 110-6, the third group including the third and seventh cabinets 110-3 and 110-7, the fourth group including the fourth and eighth cabinets 110-4 and 110-8, the fifth group including the ninth and thirteenth cabinets 110-9 and 110-13, the sixth group including the tenth and fourteenth cabinet 110-10 and 110-14, the seventh group including the eleventh and fifteenth cabinets 110-11 and 110-15, and the eighth group including the twelfth and sixteenth cabinets 110-12 and 110-16 as groups to which the re-scaled image is to be transmitted.

The processor 220 may transmit a re-scaled image to a group through at least one port connected to the identified group, among a plurality of ports. The re-scaled image transmitted to each group may be an image respectively corresponding to each group.

The processor 220 may decompose the re-scaled image. The decomposed image refers to an image that is obtained by decomposing the re-scaled image based on the number of a plurality of cabinets included in the identified group and the position of each cabinet.

For example, as shown in FIG. 5, when a plurality of cabinets included in the identified group are arranged in 4×4 format, the processor 220 may divide the scaled image into 16 equal parts by dividing the re-scaled image of which aspect ratio is 5760:3240 located at the central area of the virtual area of which aspect ratio is 7680:4320 into four equal parts from the left side to the right side and by into four equal parts from the upper side to the lower side.

Among the image that is divided into 16 equal parts, the processor 220 may identify an image corresponding to the first and fifth cabinets 110-1 and 110-5 as an image corresponding to the first group, identify an image corresponding to the second and sixth cabinets 110-2 and 110-6 as an image corresponding to the second group, identify an image corresponding to the third and seventh cabinets 110-3 and 110-7 as an image corresponding to the third group, identify an image corresponding to the fourth and eighth cabinets 110-4 and 110-8 as an image corresponding to the fourth group, identify an image corresponding to the fifth and ninth cabinets 110-5 and 110-9 as an image corresponding to the fifth group, identify an image corresponding to the tenth and thirteenth cabinets 110-10 and 110-13 as an image corresponding to a sixth group, identify an image corresponding to the eleventh and fifteenth cabinets 110-11 and 110-15 as an image corresponding to a seventh group, and identify an image corresponding to the twelfth and sixteenth cabinets 110-12 and 110-16 as an image corresponding to the eighth group.

The processor 220 may transmit an image corresponding to each group to each of the plurality of groups through each of the plurality of ports. Specifically, the processor 220 may transmit each of the images corresponding to the first through eighth groups to each of the first through eighth groups through each of the first through eighth ports, respectively.

The processor 220 may transmit information on a position on which an image corresponding to each group is to be displayed to each of the plurality of groups.

Specifically, the processor 220 may transmit information on a position on which an image corresponding to each cabinet is to be displayed to each of the plurality of groups. According to an embodiment, the position on which an image is to be displayed may be represented as a coordinate.

For example, referring to FIG. 5, when the second cabinet 110-2 is a cabinet having a resolution of 1920×1080, the pixels of the lower left correspond to the coordinate (1, 1), the pixels of the right upper end correspond to coordinate (1920, 1080), and the remaining pixels can also be represented by coordinates. In the second cabinet 110-2, when the position on which the image is to be displayed is a lower area when the entire area of the second cabinet 110-2 is divided into two equal parts in a horizontal direction, the processor 220 may transmit, to the second group, information that the pixel corresponding to coordinate (1, 1) to the pixel corresponding to coordinate (960, 540) is the positions on which an image is to be displayed.

Accordingly, as for the second cabinet 110-2, the modular display apparatus 100 may display an image corresponding to the second cabinet 110-2 in an area including the pixel corresponding to coordinate (1, 1) to the pixel corresponding to coordinate (960, 540), among the entire area of the second cabinet 110-2.

Similarly, the processor 220 may transmit the information on the position on which the image is to be displayed by each cabinet to the modular display apparatus 100, for first, third, fifth, eighth, ninth, and twelfth to sixteenth cabinets 110-1, 110-3 to 110-5, 110-8, 110-9, 110-12 to 110-16.

The modular display apparatus 100 may display a re-scaled image on the central area of a screen as illustrated in FIG. 5.

It is understood that the information on a position including the aforementioned coordinate is merely exemplary, and information on the position on which an image is to be displayed is not limited thereto.

For example, the processor 220 may transmit an image signal including a blank area and an image area to the second group described above. In this case, the modular display apparatus 100 may identify a plurality of display modules corresponding to a blank area and an image area among a plurality of display modules corresponding to the second group, and display an image corresponding to the second group through a plurality of display modules corresponding to the image area.

It has been described that an area in which the re-scaled image is not displayed is processed to black, but it is understood that one or more other embodiments are not limited thereto.

Figure 6:
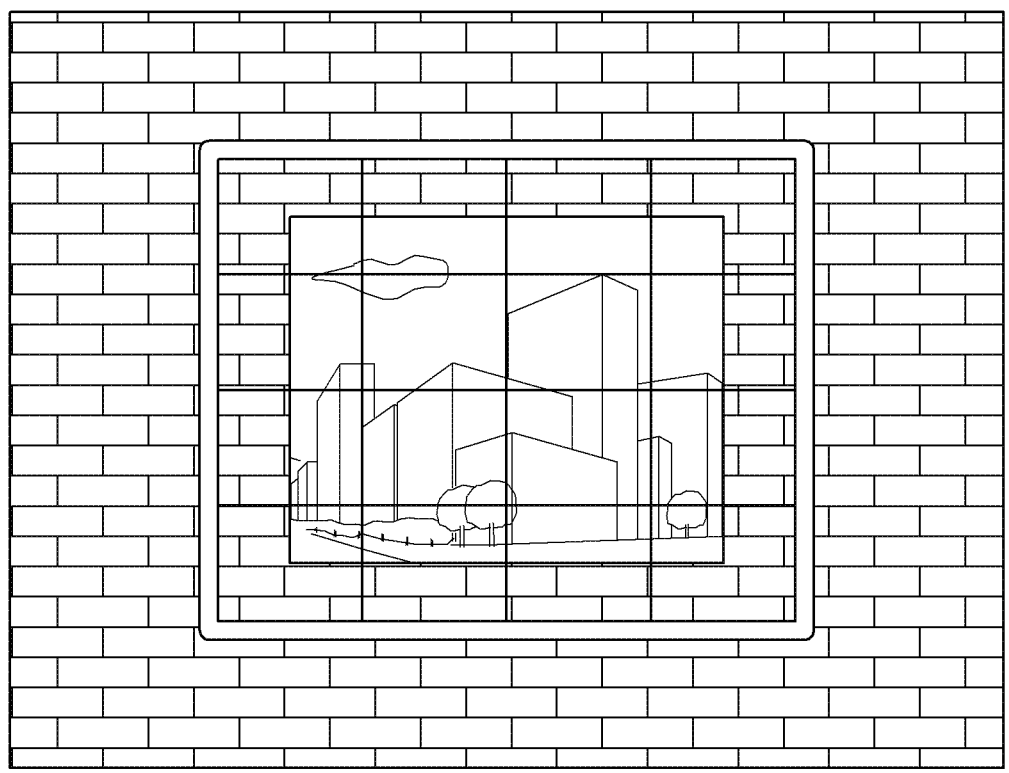
FIG. 6 is a view illustrating a display of a background image in an area where a re-scaled image is not displayed in a modular display apparatus according to an embodiment.

For example, referring to FIG. 6, an area in which the re-scaled image is not displayed may display a background image around the modular display apparatus 100 according to another embodiment.

The processor 220 may transmit the background image other than the aforementioned re-scaled image to each of a plurality of groups of the modular display apparatus 100. The processor 220 may transmit information on a position where the background image is to be displayed to each of a plurality of groups.

For example, in the above-described embodiment, the processor 220 may transmit (e.g., control to transmit) information to the second group that pixels corresponding to the coordinate (1, 1) to coordinate (960, 540) of the second cabinet 110-2 are the position where the re-scaled image is to be displayed, and the information that the pixels corresponding to coordinate (1, 541) to coordinate (1920, 1080) are the position where the background image is to be displayed. Similarly, by applying the same technical idea in the case of another group, the processor 220 may transmit, to each group, a background image to be displayed in an area where the re-scaled image is not displayed.

As illustrated in FIG. 6, an effect may be provided in that a background image may be displayed on an area where the re-scaled image is not displayed, and as if the re-scaled image is displayed on a wall.

The background image may be obtained from an image that captures an area around the modular display apparatus 100. Alternatively, the background image may be obtained from an image that captures a rear area of the modular display apparatus 100. Further, the background image may be selected by a user or pre-set, pre-stored, etc.

In addition, although an embodiment in which a background image is displayed in an area where the re-scaled image is not displayed has been described, the disclosure may display various images other than the background image in an area where the re-scaled image is not displayed. For example, the disclosure may display a re-scaled image in some areas of the modular display apparatus 100, and may display various images such as a broadcast image, a pre-stored photo, a watch object, or the like, in some remaining areas of the modular display apparatus 100.

Figure 7:
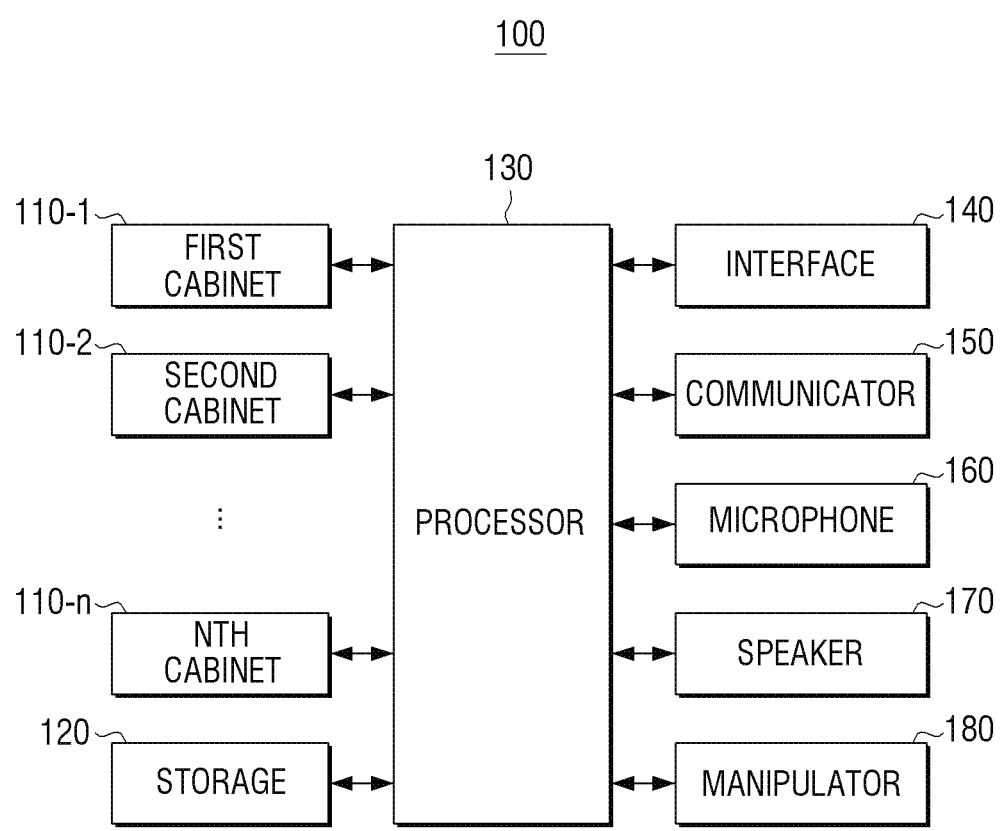
FIG. 7 is a block diagram illustrating a modular display apparatus, according to an embodiment.

FIG. 7 is a block diagram illustrating a modular display apparatus 100 according to an embodiment. As described above, the modular display apparatus 100 may be a display apparatus that physically connects a plurality of cabinets. Referring to FIG. 7, a modular display apparatus 100 according to an embodiment includes first to Nth cabinets **110-1, 110-2, . . . , 110-*n*, a storage 120, a processor 130 (e.g., at least one processor), an interface 140, a communicator 150 (e.g., a communication interface, communication circuitry, etc.), a microphone 160, a speaker 170, and a manipulator 180. It is understood, however, that one or more of the aforementioned components may be omitted and/or one or more additional components may be included in the modular display apparatus 100** according to various embodiments.

Each of the first to Nth cabinets **110-1, 110-2, . . . , 110-*n*, may include at least one display module, e.g., six display modules as illustrated in FIG. 1A. Each display module in the respective cabinet may be physically connected. Further, each display module may be implemented as at least one of an LED display module (or an LED-backlit display module), an LCD panel, an OLED panel, an AMOLED panel, a PDP, etc. Further, the first to Nth cabinets 110-1, 110-2, . . . , 110-*n*** may be connected in a bezel-less fashion and may display a seamless image in which there is no disconnection between modules and/or between cabinets in display an image.

Each of the first to Nth cabinets **110-1, 110-2, . . . , 110-*n*, may include a base plate for mounting the display modules, respectively. For example, the base plate may be implemented in a manner that each display module may be mounted on the front surface of the base plate. Additionally, one or more of the first to Nth cabinets 110-1, 110-2, . . . , 110-*n*,** may include one or more couplers for coupling the cabinet with one or more other cabinets.

Accordingly, the first to Nth cabinets **110-1, 110-2, . . . , 110-*n* according to an embodiment may be implemented as a modular display apparatus 100** through coupling with one or more cabinets.

The modular display apparatus 100 may display an image through a display module included in each of the plurality of cabinets 110-1 to 110-16. Here, the image may be an image received from an external device, a prestored image, etc.

The storage 120 (e.g., at least one storage) may store one or more instructions executable by the processor 130 to control an overall operation of the modular display apparatus 100. Further, the storage 120 may store an image (e.g., still image or moving image) or image portions displayable on the modular display apparatus 100, audio data, multimedia content, etc. The storage 120 may also store a background image (or like image) displayable by one or more of (or one or more portions of) the first to Nth cabinets **110-1, 110-2, . . . , 110-*n*. Moreover, the storage 120 may store position information, identification information, resolution, etc., of each of the first to Nth cabinets 110-1, 110-2, . . . , 110-*n*, as well as overall resolution of the modular display apparatus 100**.

The storage 120 may include at least one of a volatile storage (e.g., RAM) and a non-volatile storage (e.g., ROM, flash memory, a hard disk drive). Further, it is understood that the storage 120 may be located in or relative to one of the first to Nth cabinets **110-1, 110-2, . . . , 110-*n*, may be located in or relative to some of the first to Nth cabinets 110-1, 110-2, . . . , 110-*n*, or may be located in or relative to all of the first to Nth cabinets 110-1, 110-2, . . . , 110-*n*.**

The processor 130 controls overall operations of the modular display apparatus 100. For this purpose, the processor 220 may include one or more of a central processing unit (CPU), an application processor (AP), a communication processor (CP), etc. Further, the processor 130 may control image processing and/or displaying of a scaled image received from an electronic apparatus 100 for display on at least one of the first to Nth cabinets **110-1, 110-2, . . . , 110-*n*, as described above with reference to FIGS. 4A to 4F, 5, and 6**.

For example, the first to Nth cabinets **110-1, 110-2, . . . , 110-*n* may be divided into a plurality of groups in a vertical or a horizontal direction (e.g., by the electronic apparatus). The processor 130** may control to display a scaled image based on an image (or image portions) corresponding to each group (or one or more of the groups) being received through respective ports corresponding to the groups.

Specifically, when (or based on) an image corresponding to the first group is transmitted in a fifth cabinet from a first port of the electronic apparatus 200, the processor 130 may control to transmit or provide the received image to the first cabinet 110-1 connected by a daisy-chain method, and when (or based on) an image corresponding to a second group is transmitted to a sixth cabinet from a second port, the received image may be transmitted or provided to the second cabinet 110-2 connected by the daisy-chain method. Similarly, each cabinet connected to a port of the electronic apparatus 200 may perform the same operation as the above-described method.

The processor 130 may control to reproduce an image corresponding to a position of each cabinet in a received image by cropping through a timing controller (T-CON) included in each cabinet.

Further, the processor 130 may control to provide or transmit, to the electronic apparatus 200, at least one of position information, identification information, resolution information, etc., of the first to Nth cabinets **110-1, 110-2, . . . , 110-*n*, and of the modular display apparatus 100** as a whole.

The interface 140 may be connected to the electronic apparatus 200. The interface 140 may be connected to the electronic apparatus 200 through a port (e.g., at least one port). To be specific, the interface 140 may be connected to the electronic apparatus 200 through a cable connected to the port. Here, the cable may be a high definition multimedia interface (HDMI) cable. The HDMI cable is merely an example, and it is understood that the cable may vary. For example, the cable may be a digital visual interface (DVI) cable, a low voltage differential signals (LVDS) cable, an optical cable, etc.

In addition, the interface 140 may be connected to the electronic apparatus 200 through wireless communication. In this case, the interface 140 may include a Wi-Fi chip, a Bluetooth chip, a wireless communication chip, or the like.

The interface 140 may be connected to the electronic apparatus 200 through each of a plurality of ports. For example, as illustrated in FIG. 1C, in the case of the modular display apparatus 100 in which the cabinets **110-1, 110-2, . . . , 110-*n* are coupled in a 4×4 format, the interface 140 may connect the cabinets 110-1, 110-2, . . . , 110-*n* through each of a plurality of ports. For this purpose, the interface 140 may include at least 16 ports corresponding to each of the cabinets 110-1, 110-2, . . . , 110-*n*.**

According to another embodiment, the interface 140 may connect, to the electronic apparatus 200, some cabinets among the cabinets **110-1, 110-2, . . . , 110-*n*** through each of the plurality of ports.

The communicator 150 may connect the modular display apparatus 100 with an external source (e.g., a server, the Internet, a local network, etc.) through a wired and/or wireless communication method. For example, the communicator 150 may receive an image or information for display on the modular display apparatus 100 from an external source.

The microphone 160 may receive an audio input, e.g., a user voice input. For example, the processor 130 may control an operation of the modular display apparatus 100 or provide a control command to the electronic apparatus 200 based on a voice input received via the microphone 160.

The speaker 170 may output audio, e.g., audio corresponding to an image signal displayed by the cabinets 110-1, 110-2, . . . , 110-n.

The manipulator 180 includes one or more input devices or mechanisms through which a user input is receivable. For example, the manipulator can include at least one of buttons, a rotatable dial, a trackpad, a trackpad, a touch screen, etc. The processor 130 may control an operation of the of modular display apparatus 100 or control to provide a command or input to the electronic apparatus 200 or external device based on an user input received via the manipulator 180. For example, a user input for selecting a resolution, for scaling an image and/or for controlling a display position of a scaled image on the cabinets 110-1, 110-2, . . . , 110-n may be received via the manipulator 180.

Figure 8:
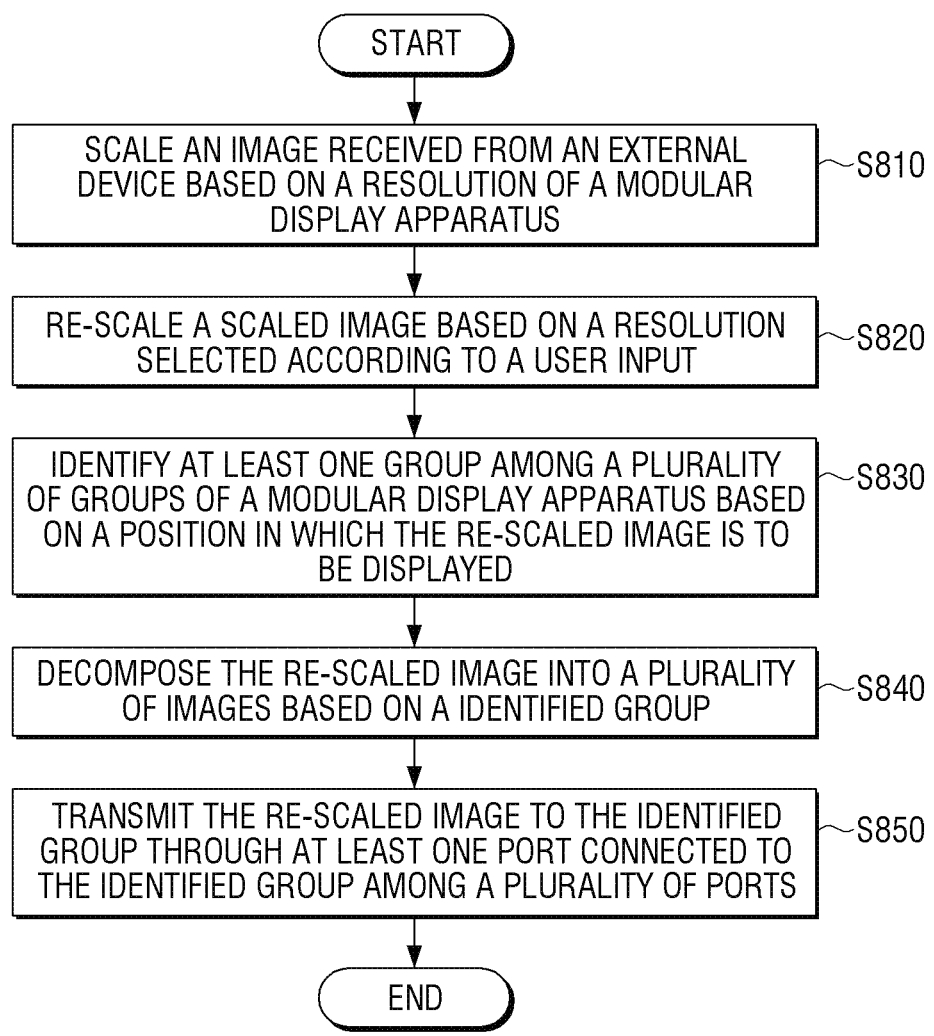
FIG. 8 is a flowchart illustrating a controlling method of an electronic apparatus according to an embodiment.

FIG. 8 is a flowchart illustrating a controlling method of an electronic apparatus according to an embodiment.

Referring to FIG. 8, the electronic apparatus according to an embodiment may scale an image received from an external device based on the resolution of a modular display apparatus in operation S810. Here, the resolution of the modular display apparatus may be identified based on the number of pixels included in a plurality of display modules of the modular display apparatus.

The electronic apparatus may re-scale the scaled image based on a resolution selected according to a user input in operation S820. According to an embodiment, the electronic apparatus may transmit the scaled image to the modular display apparatus and, while the scaled image is being displayed on the modular display apparatus in response to the transmission, the electronic apparatus may re-scale the scaled image based on the resolution selected according to the user input, if the user input is received. Here, the resolution selected according to the user input may be lower than the resolution of the modular display apparatus.

The electronic apparatus may identify at least one group based on the location where the re-scaled image is to be displayed among the plurality of groups of the modular display apparatus in operation S830. Specifically, the electronic apparatus may identify at least one group, taking into account the location at which the re-scaled image is to be displayed, the resolution of the modular display apparatus, and the resolution of the re-scaled image. Here, the location where the re-scaled image is to be displayed may be defaulted to the central area of the modular display apparatus, and may be variously set and changed according to user input.

The electronic apparatus may divide the re-scaled image into a plurality of images based on the identified group in operation S840. Specifically, the electronic apparatus may divide the re-scaled image based on a cabinet included in the identified group, and identify an image corresponding to each of the plurality of cabinets included in the same group as an image corresponding to the corresponding group.

In operation S850, the electronic apparatus may transmit, to the identified group, the decomposed re-scaled image through at least one port connected to the identified group among the plurality of ports. Here, the decomposed re-scaled image may be an image corresponding to the corresponding group. Accordingly, the modular display apparatus may display a re-scaled image. In particular, since the modular display apparatus displays a re-scaled image with a selected resolution in accordance with user input at a selected location according to user input, the disclosure may provide an image of various sizes or proportions to the user at various locations.

According to various embodiments as described above, the modular display apparatus may provide an image of a resolution consistent with a user's needs or desires. A user may freely select an area to display an image, and accordingly, images of various ratios, such as 21:9, 4:3 or 16:9, may be displayed.

Since the display area may be selected according to the user's input, an image can be displayed in an optimal state in the modular display apparatus. For example, if a user selects an image of a 21:9 ratio, the modular display apparatus according to an embodiment can select a display area at a ratio of 21:9 to optimally display an image, e.g., via the processor 130.

In the modular display apparatus (e.g., by control of the processor 130), after the image is up-scaled to the maximum panel resolution identified by the plurality of display modules, the size of the display area is again adjusted to the resolution selected by the user to display the image, and the display module in the area where an image is not displayed is not driven. Thus, power consumption may be reduced. Alternatively, a background image corresponding to a background around the modular display apparatus may be displayed in an area where the image is not displayed, thereby providing a visual effect as if an image is displayed on a wall.

While the above-described embodiments provide an electronic apparatus 200 separate from the modular display apparatus 100, it is understood that one or more other embodiments are not limited thereto. For example, according to another embodiment, the electronic apparatus 200 may be integrally provided with the modular display apparatus 100, and/or may be implemented via the processor 130 of the modular display apparatus 100.

A non-transitory computer readable medium which stores a program for sequentially executing a method for controlling an electronic apparatus according to an embodiment may be provided.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely examples and are not to be construed as limiting the disclosure. The present teaching can be readily applied to other types of apparatuses. Also, the description of the embodiments of the disclosure is intended to be illustrative, and not to limit the scope of the claims, and many alternatives, modifications, and variations will be apparent to those skilled in the art. While one or more embodiments have been described above with reference to the figures, it will be understood by those of ordinary skill in the art that various changes in form and details may be made therein without departing from the spirit and scope as defined by the following claims and their equivalents.

What is claimed is:

1. An electronic apparatus comprising:
    an interface connectable to a modular display apparatus including a plurality of display cabinets divided into a plurality of groups, the interface comprising a plurality of ports connectable to the plurality of groups; and
    a processor configured to:
        scale an image received from an external device based on a resolution of the modular display apparatus,
        re-scale the scaled image based on a resolution selected in accordance with a user input,
        identify at least one group, among the plurality of groups, based on a position in which the re-scaled image is to be displayed,
        decompose the re-scaled image into a plurality of images based on the identified at least one group, and
        control to transmit the decomposed re-scaled image to each of the identified at least one group through at least one port, among the plurality of ports, connected to the identified at least one group.

2. The electronic apparatus of claim 1, wherein a size of the re-scaled image is identified based on the resolution selected in accordance with the user input.

3. The electronic apparatus of claim 1, wherein the processor is configured to:
    control to transmit the scaled image to the modular display apparatus; and
    based on receiving the user input while the transmitted scaled image is displayed on the modular display apparatus, re-scale the scaled image based on the resolution selected in accordance with the user input.

4. The electronic apparatus of claim 1, wherein:
    the resolution of the modular display apparatus is identified based on a number of pixels included in the plurality of display cabinets; and
    the resolution selected in accordance with the user input is lower than the resolution of the modular display apparatus.

5. The electronic apparatus of claim 1, wherein the processor is configured to:
    identify a position in which the decomposed re-scaled image is to be displayed by the plurality of groups based on the resolution of the modular display apparatus and the resolution of the re-scaled image; and
    control to transmit, to the identified at least one group, information on the identified position in which the decomposed re-scaled image is to be displayed.

6. The electronic apparatus of claim 5, wherein:
    each of the plurality of display cabinets includes a plurality of display modules; and
    at least one display module, among a plurality of display modules included in the identified at least one group, is configured to display the decomposed re-scaled image based on the information on the position, and remaining display modules other than the at least one display module, among the plurality of display modules included in the identified at least one group, are not driven.

7. The electronic apparatus of claim 5, wherein the processor is configured to:
    based on a presence of an area, among areas corresponding to the identified at least one group, in which the re-scaled image is not displayed being identified based on the information on the position, control to transmit a background image to be displayed on the area in which the re-scaled image is not displayed to the identified at least one group.

8. The electronic apparatus of claim 1, wherein the processor is configured to:
    control to transmit a background image to be displayed on at least one display module included in remaining groups, other than the identified at least one group, to the remaining groups through at least one port connected to the remaining groups.

9. The electronic apparatus of claim 1, wherein at least one display module included in a remaining group, other than the identified at least one group, is not driven.

10. The electronic apparatus of claim 1, wherein:
    each of the plurality of display cabinets includes a plurality of display modules; and
    each of the plurality of display modules comprises a plurality of micro light emitting diode (LED).

11. A controlling method of an electronic apparatus, the method comprising:
    scaling an image received from an external device based on a resolution of a modular display apparatus including a plurality of display cabinets divided into a plurality of groups;
    re-scaling the scaled image based on a resolution selected in accordance with a user input;
    identifying at least one group, among the plurality of groups, based on a position in which the re-scaled image is to be displayed;
    decomposing the re-scaled image into a plurality of images based on the identified at least one group; and
    transmitting the decomposed re-scaled image to each of the identified at least one group through at least one port, among a plurality of ports respectively connected to the plurality of groups, connected to the identified at least one group.

12. The method of claim 11, wherein a size of the re-scaled image is identified based on the resolution selected in accordance with the user input.

13. The method of claim 11, wherein the re-scaling comprises:
    transmitting the scaled image to the modular display apparatus; and
    based on receiving the user input while the transmitted scaled image is displayed on the modular display apparatus, re-scaling the scaled image based on the resolution selected in accordance with the user input.

14. The method of claim 11, wherein:
    the resolution of the modular display apparatus is identified based on a number of pixels included in the plurality of display cabinets; and
    the resolution selected in accordance with the user input is lower than the resolution of the modular display apparatus.

15. The method of claim 11, further comprising:
    identifying a position in which the decomposed re-scaled image is to be displayed by the plurality of groups based on the resolution of the modular display apparatus and the resolution of the re-scaled image; and
    transmitting, to the identified at least one group, information on the identified position in which the decomposed re-scaled image is to be displayed.

16. The method of claim 15, wherein:
    each of the plurality of display candidates includes a plurality of display modules; and
    at least one display module, among a plurality of display modules included in the identified at least one group, is configured to display the decomposed re-scaled image based on the information on the position, and remaining display modules other than the at least one display module, among the plurality of display modules included in the identified at least one group, are not driven.

17. The method of claim 15, further comprising:
based on a presence of an area, among areas corresponding to the identified at least one group, in which the re-scaled image is not displayed being identified based on the information on the position, transmitting a background image to be displayed on the area in which the re-scaled image is not displayed to the identified at least one group.

18. The method of claim 11, further comprising:
transmitting a background image to be displayed on at least one display module included in remaining groups, other than the identified at least one group, to the remaining groups through at least one port connected to the remaining groups.

19. The method of claim 11, wherein at least one display module included in a remaining group, other than the identified at least one group, is not driven.

20. The method of claim 11, wherein:
each of the plurality of display cabinets includes a plurality of display modules; and
each of the plurality of display modules comprises a plurality of micro light emitting diode (LED).

* * * * *